UNITED STATES PATENT OFFICE.

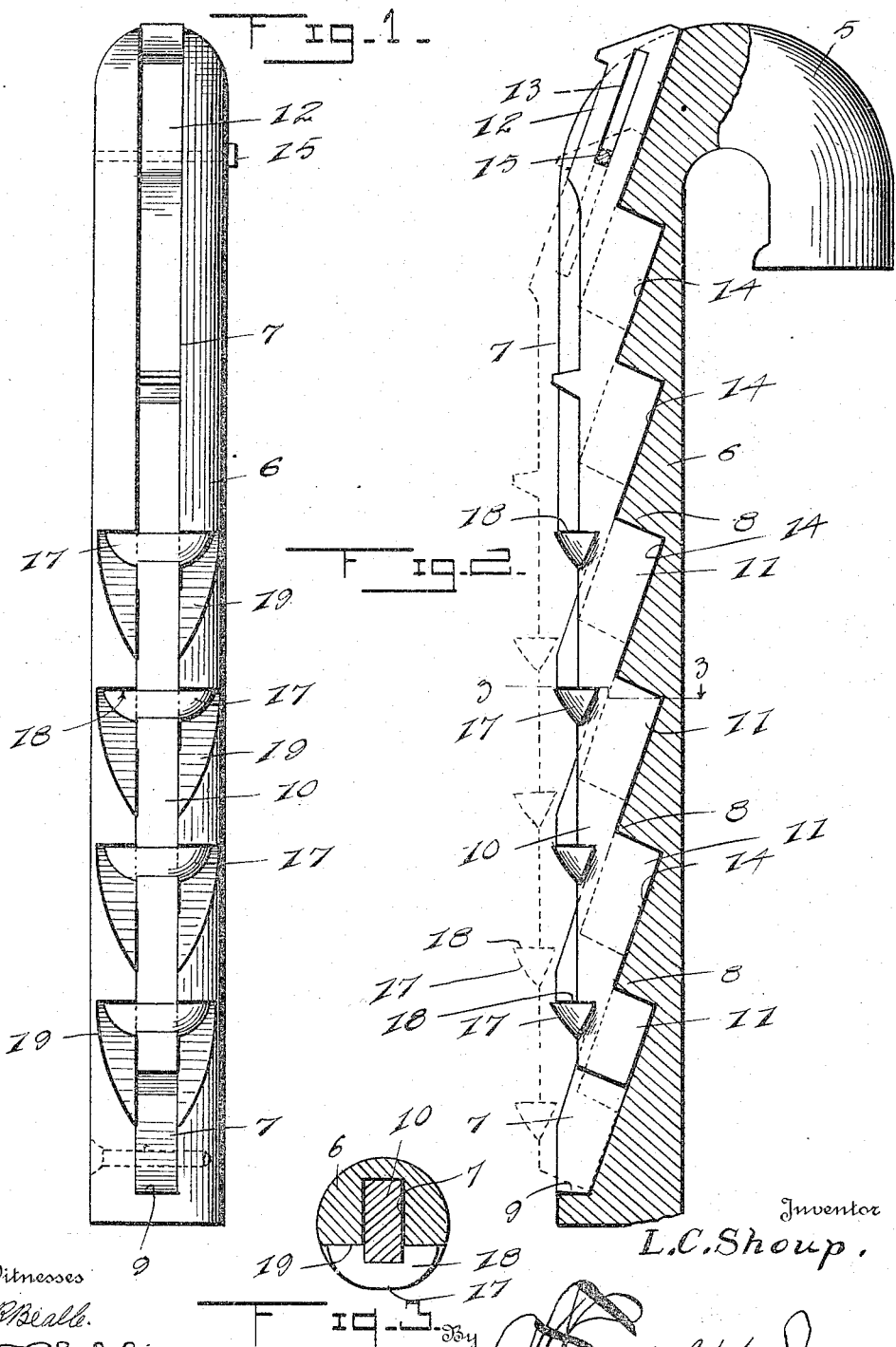

LEWIS C. SHOUP, OF FAIRMOUNT CITY, PENNSYLVANIA.

ANCHOR.

1,193,436.　　　Specification of Letters Patent.　　Patented Aug. 1, 1916.

Application filed February 15, 1916. Serial No. 78,466.

*To all whom it may concern:*

Be it known that I, LEWIS C. SHOUP, a citizen of the United States, residing at Fairmount City, in the county of Clarion and State of Pennsylvania, have invented certain new and useful Improvements in Anchors; and I do hereby declare the following to be a full, clear, and exact description of the invention, such as will enable others skilled in the art to which it appertains to make and use the same.

This invention relates to anchors, and more particularly to a device of this character particularly designed for anchoring the ends of cables in mining operations.

The invention has for its object to provide an improved anchor and means movable to operative position subsequent to setting the anchor to reliably retain the latter in position.

With this and other objects in view, the invention consists in the novel construction, combination and arrangement of parts as will be hereinafter specifically described, claimed and illustrated in the accompanying drawing, in which:

Figure 1 represents an edge elevation of the improved anchor, Fig. 2 represents a side elevation thereof, partly in section, and Fig. 3 represents a transverse sectional view on the line 3—3 of Fig. 2.

Referring to the drawing in detail, wherein similar reference numerals designate corresponding parts throughout the several views, the numeral 5 indicates a preferred type of hook, having an elongated cylindrical shank 6 connected therewith. The side of the shank 6 opposite the free end of the hook 5 is formed with a longitudinally extending groove 7, having the inner wall thereof shaped to define a plurality of ratchet teeth 8 directed toward the free end of the shank. The groove 7 terminates in spaced relation to the free end of the shank 6 and provides at the end thereof a stop shoulder 9, for a purpose which will hereinafter appear.

The securing or locking element for the anchor includes a bar 10, having a plurality of ratchet teeth 11 formed upon the inner edge thereof which snugly fit the teeth 8 of the shank. The end of the bar 10 adjacent the hook 5 is formed with a reduced extension 12, which, when the locking element is in inoperative position, as illustrated in full lines in Fig. 2, projects beyond the convex surface of the bight portion of the hook, so as to provide means whereby the end of the bar may be struck by a hammer or other suitable tool to move the latter longitudinally of the anchor shank. The reduced end 12 of the bar is formed with a longitudinal slot 13 disposed in parallel relation to the inclined faces 14 of the teeth 8 and 11 and slidably receiving the pin 15, extending transversely through the walls of the groove 7. The longitudinal movement of the bar 10 in one direction, relative to the shank 6, is limited by the engagement of one end thereof with the shoulder 9 and the pin 15, which engages the end of the slot 13 at the opposite end thereof.

The outer edge of the bar 10 is formed with a plurality of spaced projections or heads 17, which project upon opposite sides of the bar 10 and are so constructed as to provide anchoring faces 18 disposed at right angles to the longitudinal axis of the shank 6 and adapted, when the locking element 10 is moved outwardly to the dotted line position illustrated in Fig. 2, to firmly anchor the shank in the earth. The portions of the shank 6 lying upon opposite sides of the grooves 7 are cutaway, as indicated at 19, to accommodate the anchoring members or projections 17, when the retaining element is moved to inoperative position.

In use, the bar or retaining element 10 is moved to the full line position illustrated in Fig. 2, and the free end of the shank 6 is set and subsequently driven into the earth at the desired point. After the shank is driven to the proper depth the bar or locking element 10 is loosened so as to be freely movable with relation to the shank 6 by tapping upon the exposed end of the reduced extension 12 with a hammer or other suitable tool. The shank 6 is then moved a distance outwardly or withdrawn so as to cause the bar 10 to move outwardly to operative position, as illustrated in dotted lines in Fig. 2. The inclined faces 14 of the bar teeth 11 operating upon the corresponding inclined faces of the teeth 8 cause the bar 10 or locking element to be moved laterally and outwardly of the shank 6, and thereby firmly embed the projections or anchoring faces 18 in the earth.

What I claim is:

1. An anchor including a hook, a shank connected therewith having a longitudinal groove, and spaced recesses arranged on opposite sides of said groove, a bar slidable longitudinally of said shank and arranged in said groove, means for effecting lateral or outward movement of said bar with relation to said shank during longitudinal movement of said bar, and a plurality of anchoring members carried by said bar projecting laterally upon opposite sides of the latter and movable into said recesses.

2. An anchor including a hook, a shank carried thereby, said shank having a longitudinal groove, and a plurality of recesses formed in the grooved surface thereof, ratchet teeth formed upon the inner wall of said groove, a bar slidable longitudinally of said shank and arranged in said groove, a plurality of laterally projecting ratchet teeth formed upon the inner edge of said bar engaging the first-mentioned ratchet teeth, and a plurality of anchoring members carried by said bar and movable into said recesses.

In testimony whereof I affix my signature in presence of two witnesses.

LEWIS C. SHOUP.

Witnesses:
O. L. GEER,
CHARLES J. KAH.

Copies of this patent may be obtained for five cents each, by addressing the "Commissioner of Patents, Washington, D. C."